United States Patent [19]

Jakubowicz

[11] Patent Number: 4,519,258

[45] Date of Patent: May 28, 1985

[54] MOTORIZED PIPETTE

[75] Inventor: Raymond F. Jakubowicz, Rush, N.Y.

[73] Assignee: Eastman Kodak Company, Rochester, N.Y.

[21] Appl. No.: 540,974

[22] Filed: Oct. 11, 1983

[51] Int. Cl.[3] .......................... B01L 3/02; G01N 1/14

[52] U.S. Cl. .......................... 73/864.16; 128/DIG. 1

[58] Field of Search ........... 73/864.11, 864.12, 864.13, 73/864.14, 864.15, 864.16, 864.17, 864.18; 422/100; 128/DIG. 1; 604/152

[56] References Cited

U.S. PATENT DOCUMENTS

| | | | |
|---|---|---|---|
| 3,335,724 | 8/1967 | Gienapp | 128/DIG. 1 |
| 3,667,651 | 6/1972 | Shapiro . | |
| 3,812,843 | 5/1974 | Wootten | 128/DIG. 1 |
| 3,985,028 | 10/1976 | Yoshida . | |
| 4,101,283 | 7/1978 | Sundstrom . | |
| 4,191,187 | 3/1980 | Wright . | |
| 4,346,742 | 8/1982 | Chase et al. . | |
| 4,399,712 | 8/1983 | Oshikubo et al. | 422/100 |

FOREIGN PATENT DOCUMENTS

| | | | |
|---|---|---|---|
| 3136777 | 8/1982 | Fed. Rep. of Germany . | |

*Primary Examiner*—S. Clement Swisher

*Attorney, Agent, or Firm*—Dana M. Schmidt

[57] ABSTRACT

A pipette is described comprising a piston for generating pressure to eject liquid and a motor for moving the piston. A drive-decoupling mechanism is interposed between the motor and piston to allow the motor to decouple and overtravel without causing the piston to overtravel.

3 Claims, 8 Drawing Figures

FIG. 2
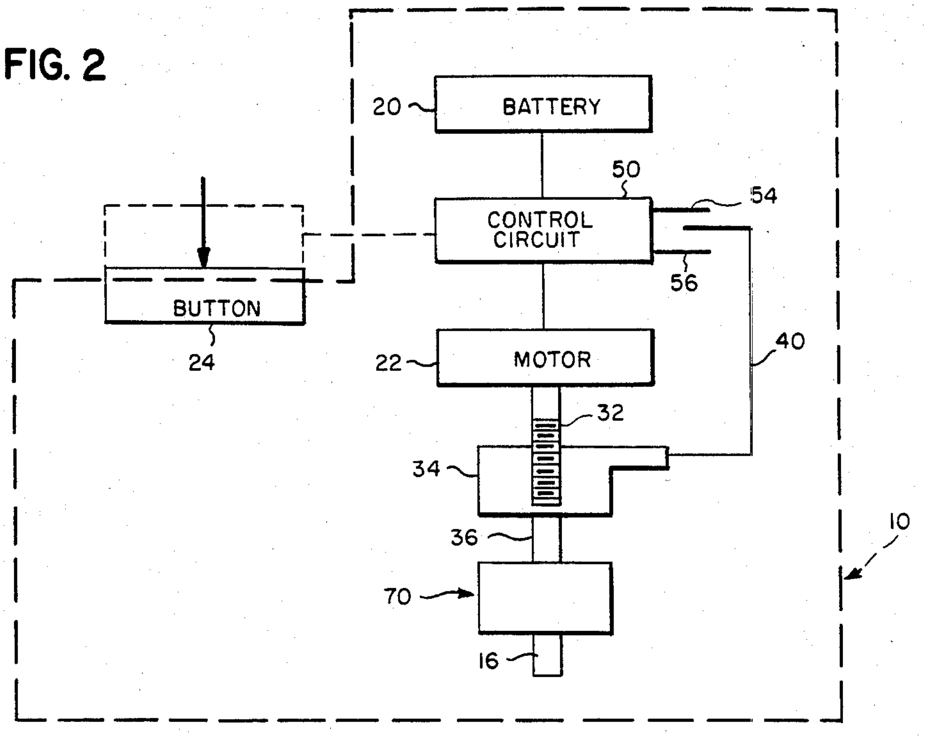
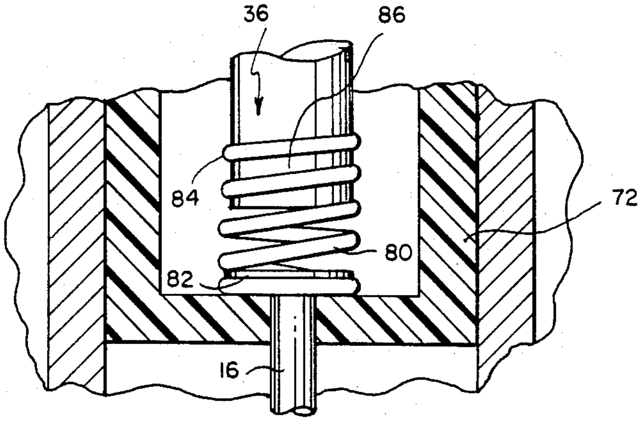
FIG. 3

FIG. 4
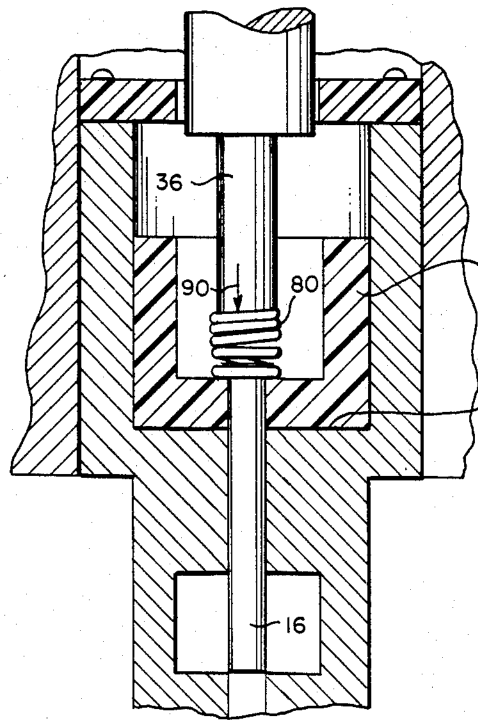
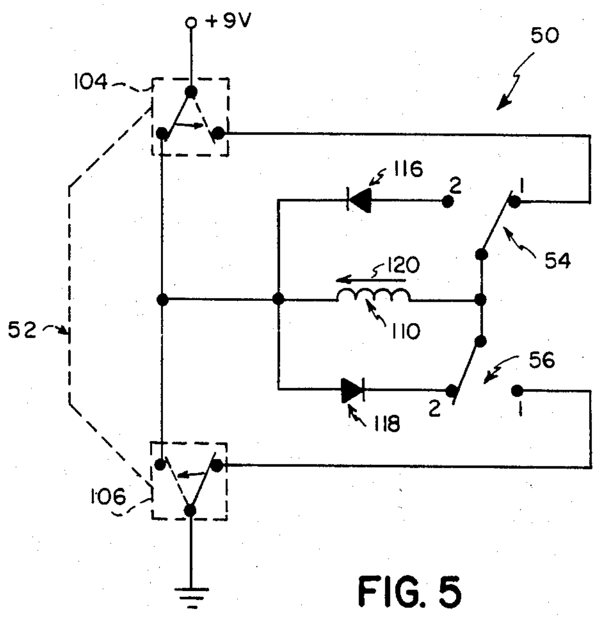
FIG. 5

MOTORIZED PIPETTE

FIELD OF THE INVENTION

This invention relates to the field of motorized pipettes.

BACKGROUND OF THE INVENTION

Motorized pipettes of the prior art commonly are driven by stepper motors to insure that the motor operates within fixed, well-defined ranges without overtravel. However, such stepper motors are less readily obtainable in small sizes at low cost than the simpler D.C. motor. Furthermore, the stepper motor usually requires more complex drive circuitry than the D.C. motor. On the other hand, the D.C. motor suffers the disadvantage of overtravel because of inertia when the power to the motor is shut off. If the motor is connected to a screw to convert rotary motion to linear motion, overtravel is likely to lock up the screw against a fixed stop. In the past, therefore, pipettes run by D.C. motors have had to include controls, usually electrical, that prevent the overtravel from occurring in the first place. Examples include, e.g., feedback control circuitry as in German OLS No. 3,136,777, published Aug. 19, 1982, wherein a potentiometer controls the degree of motor activation, based upon piston position. Such controls in turn introduce complications and sources of unreliability so that a dilemma is created that causes the potential advantages of using a D.C. motor to be largely lost.

What has been needed prior to the present invention is a motorized pipette that uses an overtraveling motor and yet avoids the complicated controls heretofore used to prevent overtravel of the motor.

SUMMARY OF THE INVENTION

I have discovered that a motorized pipette can be constructed using an overtraveling motor without such complicated controls. Unlike the previous systems, the solution is to allow the overtravel of the motor to occur, and to compensate for it as it occurs, by a drive-decoupling mechanism.

More specifically, there is provided a pipette comprising a pressure chamber, a piston for generating pressure within the chamber, and means for moving the piston between a withdrawn position and an extended position providing predetermined maximum liquid ejection, the means including (i) a motor susceptible to overtravel when activating power to the motor is terminated, (ii) drive means coupling the motor to the piston to move the piston between the withdrawn position and the extended position, and (iii) means for alternately connecting and disconnecting the motor to and from a source of such activating power. The pipette is improved in that it includes drive-decoupling means for decoupling the piston from the drive means when the piston arrives at one of the two positions from the other position. By such means, overtravel of the motor does not cause the piston to overtravel and cause, e.g., binding of the drive mechanism.

In a preferred embodiment of the invention, such drive-decoupling means includes a shuttle secured to the piston, and a resilient member secured to at least one of the shuttle and the drive means. The resilient member is operatively connected to the other so as to move the drive means and shuttle together only between a first and a final position of the shuttle.

Thus, it is an advantageous feature of the present invention that a motorized pipette is constructed using a simplified D.C. motor, without requiring complicated controls to prevent overtravel to which the motor is susceptible.

It is a related advantageous feature of the present invention that fewer electrical parts are required to construct such pipette, and fewer parts are susceptible to breakdown.

Other advantageous features will become apparent upon reference to the following Detailed Description of the Invention, when read in light of the attached drawings.

BRIEF DESCRIPTION OF THE DRAWINGS

FIG. 2 is a schematic view illustrating the control of the motor of the pipette;

FIG. 3 is an enlarged fragmentary sectional view illustrating the decoupling means of the invention;

FIG. 4 is a fragmentary sectional view of a portion of the FIG. 1 pipette, but illustrating a different operating position of the pipette;

FIG. 5 is a circuit diagram of a useful control circuit of the pipette; and

DESCRIPTION OF THE PREFERRED EMBODIMENTS

The invention is described hereinafter, for illustrative purposes, in connection with a particular motorized pipette, using a D.C. motor. In addition, the invention is useful with many other kinds of motorized pipette configurations and other motors which tend to overtravel after a switch has disconnected it from the power source.

Figure 1:
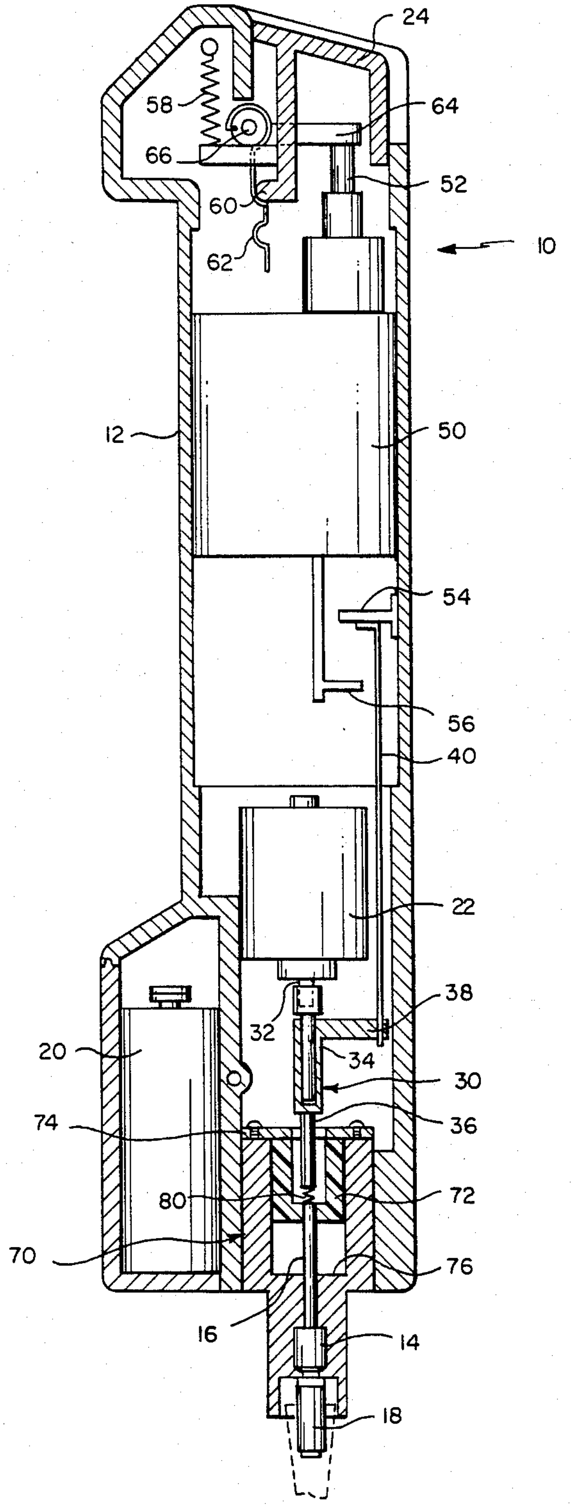
FIG. 1 is an elevational view, partially in section, of a pipette constructed in accordance with the invention.

A pipette 10 representing a preferred construction of the invention, FIG. 1, comprises a housing 12, a pressure chamber 14, a piston 16 mounted for reciprocation between a withdrawn position and an extended position with respect to the chamber, a mounting stud 18 apertured to communicate with chamber 14, the stud being used to removably mount a disposable tip (shown in phantom) that actually carries the liquid to be dispensed. (Or alternatively, twin mounting studs could be used.) To move the piston between its withdrawn and extended positions, the pipette includes a battery 20, a D.C. motor 22, and drive means 30 operatively connecting the motor to piston 16. Motor 22 is activated by battery 20 through appropriate switches, hereinafter discussed, by means of button 24 operated by the user. Drive means 30 comprises a rotating drive shaft 32 directly connected to motor 22. This shaft is threaded at its end to receive an internally threaded follower nut 34. Nut 34 in turn is provided with a protruding rod 36 that is coaxial with drive shaft 32, and a projecting arm 38 that prevents follower 34 from rotating. Arm 38 also mounts a sensing finger 40 that triggers two limit switches, as hereinafter discussed.

To control the motor, FIG. 2, a control circuit 50 is provided, connecting motor 22 to battery 20. Button 24 triggers a switch 52, FIGS. 1 and 5, in a circuit 50 described hereinafter, to activate the motor. Shaft 32 rotates to advance follower nut 34 upwardly or downwardly until one of two limit switches 54 and 56 is contacted by finger 40. Such limit switches open the circuit that connects motor 22 to battery 20.

Button 24, FIG. 1, is biased outwardly by spring 58. Bottom portion 60 of the button pushes against a torsion spring 62, so that when the button is depressed, spring 62 pivots arm 64 about pivot point 66 so as to contact switch 52.

In accordance with the invention, drive-decoupling means 70 is interposed between rod 36 and piston 16. As used herein, "drive-decoupling" means that the drive function, but not necessarily the physical contact between the parts, of the mechanism becomes decoupled. Means 70 comprises a cup-shaped member 72, hereinafter, "shuttle 72", slidably mounted in housing 12 for reciprocation between a withdrawn position, FIG. 1, to an extended, liquid-ejecting position that it finally reaches during operation, FIG. 4. These two limiting positions are determined, respectively, by a stop ring 74, bolted to the housing, FIG. 1, and the bottom surface 76 of housing 12. Shuttle 72 is attached to piston 16 for movement therewith, e.g., by molding.

Means 70 also comprises a resilient member, for example, a relatively stiff spring 80, that is attached, as better shown in FIG. 3, to both rod 36 and to shuttle 72 via piston 16. Spring 80 is sufficiently stiff as to transmit to shuttle 72 the driving motion of rod 36, so long as shuttle 72 is between the limiting positions defined by stop ring 74 and bottom surface 76. It is sufficiently resilient, however, to compress when shuttle 72 bottoms out on surface 76, and to stretch when shuttle 72 strikes ring 74. To provide these functions, most preferably spring 80 has between its ends 82, 84, only one or two turns. End 82 is wrapped, for example, around piston 16 and embedded in shuttle 72. End 84 is, for example, screwed onto threaded end 86 of rod 36.

Any material that permits shuttle 72 to slide within the housing is useful. Preferably, shuttle 72 is formed from rigid synthetic polymers, such as polycarbonate containing about 10 percent by weight poly(tetrafluoroethylene).

The compressed function of spring 80 is illustrated in FIG. 4. When shuttle 72 comes down against surface 76, it can travel no further. It has reached the position corresponding to the final position of piston 16 which provides the predetermined maximum fluid ejection. At this time, finger 40 also strikes limit switch 56, FIG. 2. However, motor 22 tends to overtravel, and such overtravel is translated into a slight amount of additional downward motion, arrow 90, FIG. 4. This downward motion compresses spring 80, without locking up rod 36 in shuttle 72.

Many conventional switching mechanisms are useful in control circuit 50. For example, FIG. 5, circuit 50 comprises latch switch 52 that includes half-switch portions 104 and 106, connected each in series with the motor armature 110. Wired in parallel to the armature 110 through limit switches 54 and 56 are diodes 116 and 118. Limit switches 54 and 56 are normally closed, with switch 54 being the upper switch and 56 the lower switch.

The circuit works as follows: The piston when not in use preferably is in the "down" position, meaning limit switch 56 is open as shown. When button 24 is pushed into the pipette, half switches 104 and 106 change from the solid line position to the dotted line position, where they are latched. Current thus flows from the battery through switch 54 and armature 110, in the direction of solid arrow 120 to provide upward motion of drive shaft 32. This draws the piston upward, and switch 56 closes to position 1. The upward movement of the piston is used to aspirate liquid into the pipette. When upper limit switch 54 is contacted, it opens (to position 2), and diode 116 shorts out armature 110 for maximum braking effect. This theoretically stops the motor, but overtravel tends to occur in D.C. motor 22. Because shuttle 72 has at this point struck stop ring 74, follower nut 34 and rod 36 can continue traveling only because the resilient spring between rod 36 and shuttle 72 permits it by stretching.

When button 24 is pushed inward a second time, switches 104 and 106 revert back to the solid line position shown, and latch again. Now, since switch 54 is at position 2 and switch 56 is at position 1, flow is reversed through armature 110 and the rod 36 descends. Immediately upon reversal of the motor to provide this downward movement, spring 80 relaxes to "reset" the relative positions of the shuttle and rod 36 of the drive-decoupling means to that shown in FIG. 3, thus permitting further decoupling when shuttle 72 again strikes stop ring 74. Even if spring 80 should lose its elasticity and not itself relax to reset the relative positions of the shuttle and rod 36, the subsequent stoppage of the shuttle against the opposite stop surface before finger 40 triggers the respective limit switch, will provide the resetting function.

During the reverse stroke of the motor, spring 80 acts to recouple shuttle 72 to rod 36 so that shuttle 72 descends with rod 36, until shuttle 72 bottoms out and limit switch 56 opens to position 2. Overtravel of the motor and of rod 36 results in spring 80 being compressed, as described above.

Figure 6:
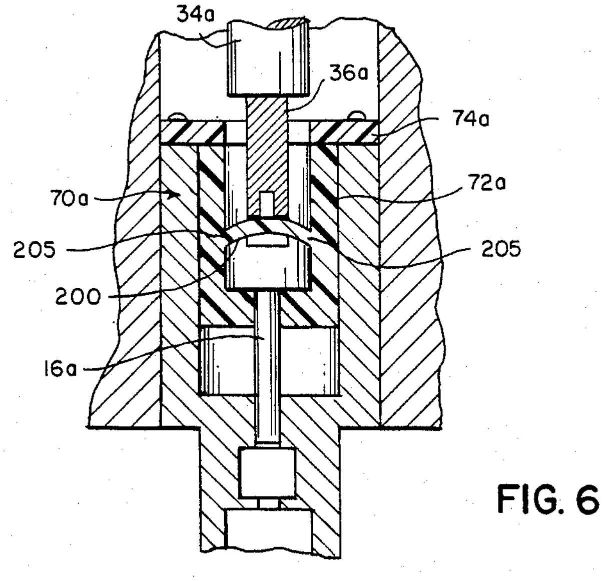
FIGS. 6–8 are fragmentary sectional views similar to those of FIG. 4, but illustrating alternative embodiments.
Figure 7:
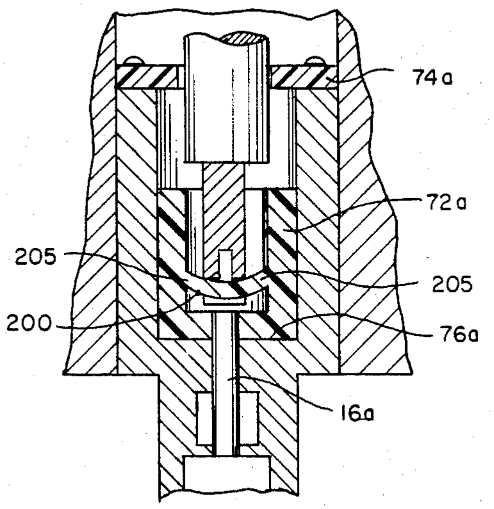
Figure 8:
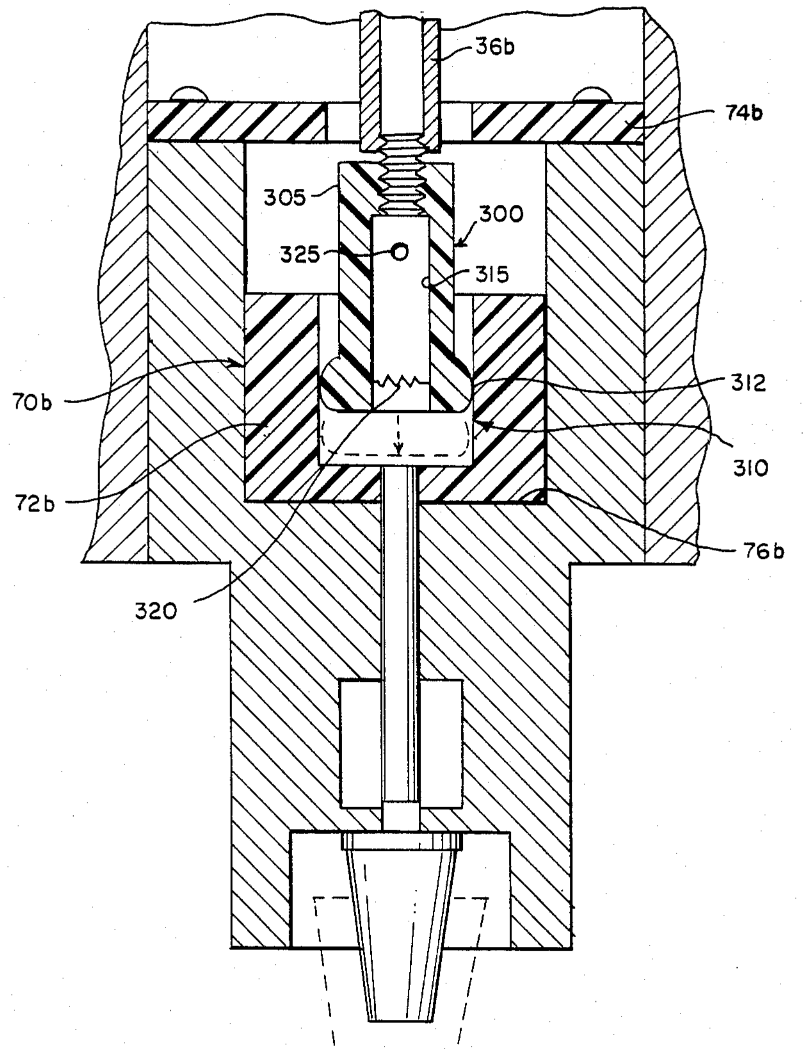

Other forms of decoupling means 70 are also useful. Two additional examples are illustrated in FIGS. 6-8. Unlike the previous embodiment, in these examples the decoupling means automatically reset at the time of decoupling, rather than after the motor reverses direction. Parts similar to those previously described bear the same reference numerals to which distinguishing suffixes "a" and "b", respectively, are appended.

Thus, in FIGS. 6 and 7, the resilient member of means 70*a* is a bistable mechanical flip-flop comprising a flap 200 that is an integral part of shuttle 72*a*. More specifically, flap 200 is bowed and connects to the rest of shuttle 72*a* by living hinges 205. Flap 200 is also bolted to rod 36*a* of the follower nut 34*a*. By reason of such construction, flap 200 is bistable and flips between the position shown in FIG. 6 in which it is more distal to piston 16*a*, and the position shown in FIG. 7 in which it is more proximal to the piston. That is, when shuttle 72*a* strikes stop ring 74*a*, FIG. 6, overtravel by the motor pulls flap 200 outwardly away from the piston from the "down" position shown in FIG. 7, to the "up" position shown in FIG. 6. When shuttle 72*a* bottoms out on surface 76*a*, FIG. 7, continued travel of the motor pushes flap 200 towards piston 16*a*, to its second stable position. Thus, each overtravel of the motor relative to the shuttle acts to both decouple the piston from the drive means and to reset the decoupling means to allow decoupling at the other end of the stroke of the shuttle. For this reason, in this embodiment it is preferred that the motor operate so as to always carry rod 36*a* beyond the position of the shuttle at each end of its stroke.

In the embodiment of FIG. 8, the resilient member of means 70*b* comprises a hollow, resilient stud 300 screwed into rod 36*b* at end 305 thereof. Opposite end 310 of stud 300 is force-fit into shuttle 72*b*, and features a bulbous exterior surface 312 and a hollow interior 315. End 310 is at all times spaced sufficiently far from the bottom portion of shuttle **72*b* as to ensure that there remains room for its overtravel motion toward that bottom portion. Optionally, a compression spring 320 is included in interior 315 at end 310 to further bias surface 312 outwardly in contact with shuttle 72*b*. At a location 325 between ends 305 and 312, stud 300** is apertured to allow compressed air to escape.

As will be readily apparent, when shuttle **72*b* bottoms out on surface 76*b*, stud 300 slips relative to shuttle 72*b* towards the position shown in phantom. When the motor is reversed, both stud 300 and shuttle 72*b* are pulled upwardly in their new relative positions, until shuttle 72*b* strikes stop ring 74*b*. At this point, the drive-decoupling means is reset when the motor continues to travel, such as by overtraveling, in that end 310 of stud 300 slips upwardly relative to the stationary shuttle 72*b***.

Alternatively, stud 300 can be modified so as to frictionally engage the outside of shuttle **72*b*, not shown, rather than the inside. In such a case, slippage relative to the outside of the shuttle occurs when the shuttle strikes stop ring 74*b* or surface 76*b***.

The invention has been described in detail with particular reference to preferred embodiments thereof, but it will be understood that variations and modifications can be effected within the spirit and scope of the invention.

What is claimed is:

1. In a pipette comprising a pressure chamber, a piston for generating pressure within the chamber, and means for moving said piston between a withdrawn position and an extended position providing predetermined maximum liquid ejection, said means including (i) a motor susceptible to overtravel when activating power to the motor is terminated, (ii) drive means coupling said motor to said piston to move said piston between said withdrawn position and said extending position, (iii) means for alternately connecting and disconnecting said motor to and from a source of such activating power, and (iv) means for reversing said motor;

the improvement wherein said pipette further includes drive-decoupling means for decoupling the drive of said piston from that of said drive means when said piston arrives at either one of said two positions from the other position, whereby overtravel of said motor does not cause said piston to overtravel, said drive-decoupling means comprising (a) a shuttle secured to said piston and mounted for linear movement within said pipette from a first position corresponding to one of said positions of said piston, to a final position corresponding to the other of said piston positions, (b) a resilient member integral with said shuttle and secured to said drive means to transmit driving force from said drive means to said shuttle when the latter is between said first and said final positions, said resilient member further comprising a bistable mechanical flip-flop that is integral with said shuttle and is secured to said drive means, said flip-flop occupying either a position distal to or proximal to said piston, depending upon whether said shuttle has last reached said final position or said first position, respectively, and stop means for limiting the travel of said shuttle to only points between said first and said final positions, said flip-flop having a resiliency sufficient, when said shuttle strikes said stop means, to allow said motor to overtravel while said shuttle remains motionless.

2. A pipette as defined in claim 1, wherein said mechanical flip-flop recouples the drive connection between said piston and said drive means when said motor is reversed.

3. A pipette as defined in claim 1, and further including reset means for resetting the position of said piston relative to said drive means for the next overtravel occurrence, simultaneous with said drive-decoupling means decoupling said piston from said drive means.

* * * * *